3,356,715
N-HEXAHALOHYDROXYISOPROPYL
CARBAMATES

Peter E. Newallis, Morris Plains, and Edmund J. Rumanowski, Jersey City, N.J., assignors to Allied Chemical Corporation, New York, N.Y., a corporation of New York
No Drawing. Filed Jan. 6, 1964, Ser. No. 336,053
4 Claims. (Cl. 260—482)

This invention relates to new herbicides, and, more particularly, refers to N-hexahalohydroxyisopropyl carbamates, processes for their preparation and to their use for the deterioration and destruction of undesirable vegetation.

It is an object of the present invention to provide new herbicidal compositions.

Another object of the present invention is to provide new N-hexahalohydroxyisopropyl carbamates.

A further object of the present invention is to provide processes for the preparation of N-hexahalohydroxyisopropyl carbamates. Other objects and advantages will become apparent from the following description.

In accordance with the present invention, N-hexahalohydroxyisopropyl carbamates having the general formula:

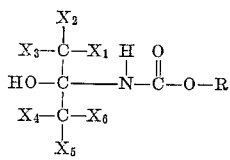

wherein $X_1$, $X_2$, $X_3$, $X_4$, $X_5$ and $X_6$ are halogens independently selected from the group consisting of chlorine and fluorine with the proviso that at least 2 of these members are fluorine and R is a member selected from the group consisting of alkyl having 1 to 12 carbon atoms, haloalkyl and polyhaloalkyl having 1 to 12 carbon atoms, substituted and nonsubstituted aryl, may be prepared by reacting a carbamate of the formula:

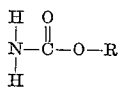

wherein R is as defined above, with a hexahaloacetone of the formula:

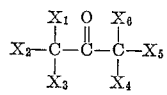

wherein $X_1$, $X_2$, $X_3$, $X_4$, $X_5$ and $X_6$ are as defined above in the presence of a suitable solvent and recovering the resulting N-hexahalohydroxyisopropyl carbamate from the reaction mixture. In the above definition, the term substituted and nonsubstituted aryl is an aromatic radical such as phenyl, benzyl, biphenyl and naphthyl which may contain alkyl or halogen substituents. Illustrative of suitable carbamate reactants are the following:

methylcarbamate
ethylcarbamate
isopropylcarbamate
n-butylcarbamate
i-butylcarbamate
pentylcarbamate
hexylcarbamate
2-chloropentylcarbamate
4-bromohexylcarbamate
n-octylcarbamate
phenylcarbamate
o-tolylcarbamate
p-tolylcarbamate
p-ethylbenzylcarbamate
2,4-dimethylbenzylcarbamate
2,4-dichlorobenzylcarbamate
1-naphthylcarbamate
1-diphenylcarbamate, and the like.

The hexahaloacetones which may be utilized in the present invention and their respective boiling points are set forth below in Table I.

Table I

| Hexahaloacetone: | Boiling point, °C. |
|---|---|
| 1,1-difluorotetrachloroacetone | 123 |
| sym-difluorotetrachloroacetone | 124 |
| 1,1,3-trifluorotrichloroacetone | 84.5 |
| 1,1,1-trifluorotrichloroacetone | 83 |
| sym-tetrafluorodichloroacetone | 45 |
| 1,1,3-tetrafluorodichloroacetone | 43 |
| pentafluorochloroacetone | 8 |
| hexafluoroacetone | −28 |

The molar ratio of the reactants may fall within the range of from about 0.5 to 2 mols carbamate per mol hexahaloacetone, however, in preferred operation, the stoichiometric molar ratio of 1 mol carbamate per mol hexahaloacetone is preferred.

The reaction temperature may vary over a wide range, i.e., from about −20° C. up to the boiling point of the reaction mixture. In preferred operation reaction temperatures from about room temperature up to about 60° C. are employed. In order to secure highest yields, extended reaction times, i.e., up to about 10 days are employed depending upon the reactivity of the particular reactants charged. Generally speaking, however, maximum yields are secured wherein reaction periods of 3 to 6 days are employed.

In many instances, the reactants do not have a common physical state. For example, most carbamates are solids whereas hexahaloacetones, with the exception of hexafluoroacetone and pentafluorochloroacetone, are liquids at room temperature. Accordingly, a suitable solvent must be employed in order to facilitate the obtainment of a homogenous reaction mixture and to secure maximum product yields. Suitable solvents employed in the present invention are illustrated by saturated aliphatic hydrocarbons and, preferably, saturated aliphatic hydrocarbons containing a nitrogen atom. It is understood, of course, that these aforementioned solvents must not produce contamination through side reactions, be a solvent for the carbamate reactant and allow for reaction under temperature and pressure variations. Illustrative of such suitable solvents are: acetonitrile, dimethyl formamide, diisopropyl ether, diethyl ether, tetrahydrofuran, diglyme, and the like. In preferred operation, a reaction mixture comprised of 1 mol amide is admixed with 400 parts of a suitable solvent such as acetonitrile. 1 mol of hexahaloacetone is added to the mixture while maintaining a reaction temperature within the range of from about room temperature to about 60° C. The resulting reaction mixture is allowed to stand for a period of 3 days under intermittent agitation. The solvent is then removed by vacuum distillation and the resulting N-hexahalohydroxyisopropyl carbamate is then taken up in a suitable solvent, such as toluene, recrystallized, filtered and dried.

The following examples illustrate the present invention. In the examples, parts are by weight.

EXAMPLE 1

To a reaction vessel equipped with a stirrer, thermometer and inlet tube was charged a reaction mixture comprised of 10.3 parts isopropylcarbamate, 16.6 parts of hexafluoroacetone and about 210 parts acetonitrile. The resulting reaction mixture was agitated and allowed to stand at room temperature for a period of 3 days. At the end of this period, acetonitrile solvent was removed by vacuum distillation, and the resulting slurry containing crude N - hexafluoro-2-hydroxy-2-propyl isopropylcarbamate immersed in a Dry Ice-acetone bath and finally isolated by filtration. The crude product was dissolved in about 20 parts toluene at room temperature and chilled in a Dry Ice-acetone bath in order to effect recrystallization. 12 parts of pure N-hexafluoro-2-hydroxy-2-propyl isopropylcarbamate, corresponding to a yield of 67% of theory, were obtained. Elemental analysis showed 31.0% carbon and 3.45% hydrogen which is in excellent agreement with the theoretical values of 31.2% carbon and 3.32% hydrogen.

EXAMPLE 2

To the reaction vessel of Example 1 was charged a reaction mixture comprised of 10.3 parts isopropylcarbamate, 22 parts of sym-tetrafluorodichloroacetone and about 28 parts of acetonitrile. The resulting reaction mixture was slowly agitated and allowed to stand for a period of 3 days. At the end of this period, the acetonitrile solvent was removed by vacuum distillation and the crude N-sym-tetrafluorodichloro-2-hydroxy-2-propyl isopropylcarbamate was dissolved in about 21 parts toluene at room temperature and immersed into a Dry Ice-acetone bath (−60° C.) in order to effect crystallization. 18 parts of pure N - sym-tetrafluorodichloro-2-hydroxy-2-propyl isopopylcarbamate having a melting point of 53–55° C., corresponding to a yield of 60% of theory, were obtained. Elemental analysis showed 27.4% carbon and 3.0% hydrogen as compared to the theoretical values of 27.8% carbon and 2.98% hydrogen.

EXAMPLE 3

To the reaction vessel of Example 1 was charged a mixture comprised of 8.9 parts ethylcarbamate, 22 parts of sym-tetrafluorodichloroacetone and about 32 parts of acetonitrile. The resulting reaction mixture was allowed to stand for a period of 3 days at room temperature after which period acetonitrile solvent was removed by vacuum distillation. Once again, crude N-sym-tetrafluorodichloro-2-hydroxy-2-propyl ethylcarbamate was then isolated by first chilling the reaction mixture followed by filtration. The resulting filtrate was again chilled and filtered to recover any product. In toto, 11.5 grams of N-sym-tetrafluorodichloro-2-hydroxy-2-propyl ethylcarbamate, corresponding to a theoretical yield of 38% and having a melting point of 47–49° C., were obtained. Elemental analysis showed 25.5% carbon and 2.64% hydrogen compared to the theoretical values of 25.0% carbon and 2.43% hydrogen.

EXAMPLE 4

To the reaction vessel of Example 1 was charged a reaction mixture comprised of 8.9 parts of ethylcarbamate, 18.3 parts of hexafluoroacetone and 275 parts of acetonitrile. The resulting reaction mixture was agitated and allowed to stand at room temperature for a period of 6 days. At the end of this time, the acetonitrile was removed by vacuum distillation and 24 parts, corresponding to a yield of 96% of theory, of N-hexafluoro-2-hydroxy-2-propyl ethylcarbamate were obtained. Elemental analysis showed 28.1% carbon and 3.34% hydrogen as compared to the theoretical values of 28.2% carbon and 2.75% hydrogen.

The N-hexahaloisopropyl carbamates of the present invention are generally useful as pre-emergence herbicides for control of established broadleaf or dicotyledonous varieties of plants such as smartweed, rape, lambsquarters, bindweed, horsenettle, Canada thistle, and broadleaf plantain; control of established more pernicious monocotyledonous plants and grasses such as ryegrass, foxtail, crabgrass and nutgrass, Johnson grass, orchard grass, meadow grass and panicum species.

When used for deterioration or destruction of undesirable vegetation, the N-hexahalohydroxyisopropyl carbamates of the present invention may be applied "as is" or, if desired, incorporated in a suitable carrier. Illustrative of such carriers are the alkylated ethers of alkylene glycols such as the dimethyl ether of ethylene glycol and the dimethylether of propylene glycol. Generally speaking, any carrier which is inert with the N - hexahalohydroxyisopropyl carbamates of the present invention, as illustrated by xylene and toluene, may be employed.

Solid carriers which may be successfully employed in either finely divided or granular form include diatomaceous earth, wood flours, silica gels, corn-cob grits, and vermiculite. These may be used as dusts or as finely divided forms can be blended with wetting and suspending agents for dispersion in water.

The concentration of the subject N-hexahalohydroxyisopropyl carbamates to liquid or solid carrier is dependent upon the formulation used but, generally speaking, will be about 5 to 80 percent by weight dependent upon local conditions, intensity of vegetation growth and sought for overall results, amounts from about 8 pounds to 30 pounds, preferably 16 pounds, of N-hexahalohydroxyisopropyl carbamate per acre can be employed.

Application of the herbicidal composition of the present invention such as conventional spraying or dusting, are within the skill of the art.

Illustrative of the herbicidal activity of the N-hexahalohydroxyisopropyl carbamates of the present invention is N-sym-tetrafluorodichloro-2-hydroxy-2-propyl ethylcarbamate when utilized in a dosage of 16 pounds per acre. This latter compound was tested in accordance with the test procedures described by Shaw and Swanson in "Weeds," volume I, No. 4, page 352 ff. (July 1962). This publication described the effect of herbicidal compositions as pre-emergent herbicides in terms of vegetation injury rating. Following the Shaw and Swanson (supra) procedures, it was determined that N-sym-tetrafluorodichloro-2-hydroxy-2-propyl isopropylcarbamate, N-hexafluoro-2-hydroxy-2-propyl isopropylcarbamate and N-hexafluoro-2-hydroxy-2-propyl ethylcarbamate were also found to exhibit effective herbicidal activity.

Particularly outstanding pre-emergence vegetation control was secured by employing N-sym-tetrafluorodichloro-2-hydroxy-2-propyl ethylcarbamate as herbicide. The data contained in Table II set forth below illustrate the effectiveness of this herbicide in pre-emergence weed control.

Table II.—N-sym-tetrafluorodichloro-2-hydroxy-2-propyl

|  | Ethylcarbamate, 16 lbs./acre | | |
| --- | --- | --- | --- |
|  | Injury Rating | Height Reduction, Percent | Plant Kill, Percent |
| Crops: |  |  |  |
| Corn | 2 | 6 | 10 |
| Cotton | 1 | 12 | 0 |
| Soybean | 5 | 20 | 26 |
| Weeds: |  |  |  |
| Ryegrass | 8 | [1] N.D. | 80 |
| Rape | 6 | N.D. | 60 |

[1] N.D.=Not Determined.

The present invention may be embodied in other forms or carried out in other ways without departing from the spirit thereof. The present embodiment is, therefore, to be considered illustrative and not restrictive.

We claim:

1. N-hexahalohydroxyisopropyl carbamates having the formula:

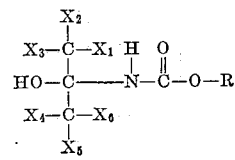

wherein $X_1$, $X_2$, $X_3$, $X_4$, $X_5$ and $X_6$ are halogens selected from the group consisting of chlorine and fluorine with the proviso that at least 2 of these members are fluorine and R is a member selected from the group consisting of alkyl having 1 to 12 carbon atoms, haloalkyl and polyhaloalkyl having 1 to 12 carbon atoms and alkyl and halo substituted and nonsubstituted aryl.

2. N - hexafluoro - 2 - hydroxy - 2 - propyl isopropylcarbamate.

3. N - sym - tetrafluorodichloro - 2 - hydroxy - 2 - propyl isopropylcarbamate.

4. N - sym - tetrafluorodichloro - 2 - hydroxy - 2 - propyl ethylcarbamate.

References Cited

UNITED STATES PATENTS

| | | | |
|---|---|---|---|
| 2,617,817 | 11/1952 | Ahlbrecht et al. | 260—482 |
| 2,709,648 | 5/1955 | Ryker et al. | 71—2.6 |
| 2,909,561 | 10/1959 | Merian et al. | 260—472 |
| 2,933,519 | 4/1960 | Sekera et al. | 260—472 |
| 3,035,969 | 5/1962 | Hartle et al. | 167—22 |
| 3,084,096 | 4/1963 | Lambrech | 260—479 |
| 3,169,850 | 2/1965 | Thompson | 71—2.6 |
| 3,203,853 | 8/1965 | Jager et al. | 167—22 |

OTHER REFERENCES

Knunyants et al.: Chemical Abstract, vol. 54, p. 22,349(d), 1960.

Knunyants et al.: Chemical Abstract, vol. 54, pp. 22,484–5, 1960.

Knunyants et al.: Chemical Abstract, vol. 57, p. 12,305(i), 1962.

Oliverio et al.: J. Org. Chemical, vol. 20, pp. 1733–1737, 1955.

LORRAINE A. WEINBERGER, *Primary Examiner.*

JAMES O. THOMAS, *Examiner.*

A. ADAMCIK, A. P. HALLUIN, *Assistant Examiners.*